United States Patent [19]

Shim et al.

[11] Patent Number: 5,566,444
[45] Date of Patent: Oct. 22, 1996

[54] TUBE-PLUGGING ASSEMBLY

[75] Inventors: Sang-Han Shim; Young-Do Kang, both of Changwon, Rep. of Korea

[73] Assignee: Korea Heavy Industries & Construction Company, Rep. of Korea

[21] Appl. No.: 285,000

[22] Filed: Aug. 4, 1994

[30] Foreign Application Priority Data

Mar. 14, 1994 [KR] Rep. of Korea .................. 5042/1994

[51] Int. Cl.⁶ .................................................. B23P 15/26
[52] U.S. Cl. ......................... 29/727; 29/890.031; 138/89
[58] Field of Search ....................... 29/890.031, 890.03, 29/727; 228/119, 183; 138/89, 87

[56] References Cited

U.S. PATENT DOCUMENTS

| | | | |
|---|---|---|---|
| 3,590,877 | 7/1971 | Leopold et al. ............................ | 138/89 |
| 3,785,291 | 1/1974 | Bergbauer et al. .................... | 102/24 R |
| 3,919,940 | 11/1975 | Ploger et al. . | |
| 4,021,907 | 5/1977 | Zondag ...................................... | 138/89 |
| 4,513,786 | 4/1985 | Sodergren et al. ................ | 29/890.031 |

FOREIGN PATENT DOCUMENTS

56-134092  10/1981  Japan .
1380964    1/1975  United Kingdom .

*Primary Examiner*—Irene Cuda
*Attorney, Agent, or Firm*—Banner & Allegretti, Ltd

[57] ABSTRACT

A tube-plugging assembly for sealing a leaking or damaged tube of a heat exchanger, either provisionally for later repair or permanently, comprises a plug, and an explosive charge and buffer subassembly disposed in the central portion of the plug. The charge and buffer subassembly is placed within the plug so as to leave an unoccupied space between the closed end of the plug and the end of the subassembly. The embodiment for provisional plugging comprises a plug having two to six grooves around its outer circumference for containing four to five annular rings of a gold-nickel alloy, and also comprises a plurality of female threads on the inside of the plug near the closed end. The embodiment for permanent plugging comprises a plug having two to six annular prominences around its outer circumference. The buffer is of a ductile polyethylene resin that transfers the explosive power to expand the plug and also absorbs any explosion debris. A connecting cord connects the explosive charge to a remote detonator.

9 Claims, 11 Drawing Sheets

TUBE-PLUGGING ASSEMBLY

BACKGROUND OF THE INVENTION

The present invention relates generally to an assembly for plugging a defective, leaking tube, and particularly to an assembly comprising explosive a plug, and a buffer, for sealing the ends of a defective tube in a heat exchanger.

Further, the present invention relates to an improved method of plugging a defective tube with the use of the above-said plugging assembly. The term "heat exchanger" used herein is to denote a nuclear-power steam generator, boiler, feed-water heater, cooler, condenser or chemical reactor, which all comprise numbers of closely spaced tubes of small diameters. In a heat exchanger, the primary fluid flowing inside the tube and the secondary fluid flowing outside the tube are of different temperatures from one another, and thus the heat exchange takes place between them.

Tubes in a heat exchanger can become defective for various reasons during a long-time use. If a tube becomes faulty during operation of the apparatus, the ends of that tube must be plugged immediately to prevent the primary and the secondary fluids from intermixing. The intermixing of the primary and the secondary fluids may cause many problems like leakage of radioactive material, decrease in heat efficiency and corrosion of the peripheral machinery.

Especially, in the case of a nuclear-power steam generator, if a tube gets damaged, the primary fluid including radioactive material contaminates the pure secondary fluid which rotates the turbine. Further, in the case of a boiler, the condenser or chemical reactor, if a tube gets faulty, salt water, undesirable chemicals or poisonous chemicals can leak out, thereby other facilities can be corroded and heat efficiency can decrease. Accordingly, the ends of a defective tube should be plugged immediately.

Quite a few methods have been developed and employed to plug the ends of a defective tube, such as, the general plugging by arc welding, plastic deformation plugging by mechanical or hydraulic enlargement of the tube and plugging by screws.

These conventional methods, however, can be employed only in the clean work area, and they cannot provide an immediate plugging. The plugging should be made promptly and flawlessly even under bad work environments, such as radioactive contamination, presence of poisonous material, high temperatures, or obstructed view.

The techniques relating to an explosive-activated plug and an improved method of plugging are disclosed in US Pat. No. 3,919,940, British Patent No. 1,380,964 and Japanese Patent laid-open No. sho 56-134,092. By these techniques, however, only permanent plugging is possible.

Furthermore, since they use a plug with quite an amount of explosive and a detonator inside, the welded sites of other, normal tubes can also be damaged due to the shock from the explosion, and the diameters of holes in tube sheet decrease after the explosion.

SUMMARY OF THE INVENTION

An object of the present invention is to provide an assembly for for effective and prompt plugging, which comprises a cylindrical plug with annular grooves or prominences around its outer circumference, an appropriate amount of explosive in the form of a rod with a circular cross section, and a cylindrical buffer.

The distinctive feature of this invention is providing two types of plugs, viz. a plug for provisional plugging which can be removed even after explosive welding, as needed, and a plug for permanent plugging, the former having several grooves of 0.25 mm to 0.45 mm in depth, formed around its outer circumference, and the latter having several prominences of 0.25 mm to 0.45 mm in height, formed around its outer circumference, which provide high hydraulic pressure resistance to a welded plug after welding by explosion. The plug of this invention has its forward end shaped in a curve of half a circle. This is deliberately designed because inside of a defective tube there invariably are prominences of the welded part, irregularly abraded surfaces, sludge, etc. which all may hinder the smooth insertion of a plug, thus it is more adequate to have the plug with its forward end curved like half a circle.

In the present invention, the explosive and buffer are set in a plug, leaving space of a certain size inside the forward end of a plug, and the detonator is set outside, separate from the plug, at the time of explosive welding. The inside of the plug is charged with an optimal quantity of explosive and the buffer but leaving empty space above the upper end of said buffer just sufficient to absorb the shock from the explosion at the time of explosion for welding so that no damage should be done to the tube sheet hole or to the welded part of other perfect tubes. Also the installation and handling of the plugging assembly being very simple, the task of plugging can be easily completed even under such extremely unfavorable circumstances as in areas contaminated with either radioactivity or poison, at extreme heat, or under poor visibility. And when high temperatures (250° C. to 450° C.) are in use of, the internal stress of an exploding plug is relieved and the adhesion with tubes get more close, as a consequence of which the increase in the hydraulic pressure resistance is obtained.

BRIEF DESCRIPTION OF THE DRAWINGS

The above-said and other objects of the invention will be seen by reference to the descriptions made in the connection with the accompanying drawings, given below.

DETAILED DESCRIPTION OF THE INVENTION

Figure 1:
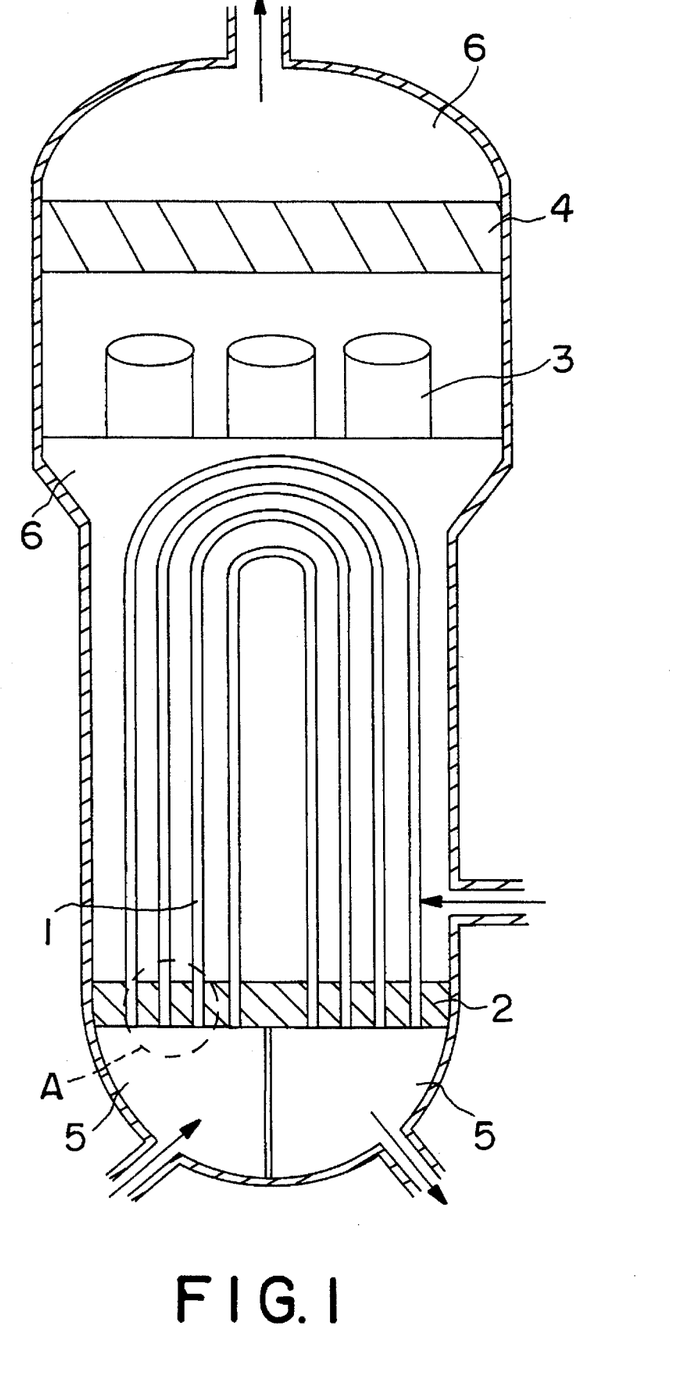
FIG. 1 is a cross-sectional view of a heat exchanger with a defective tube.
Figure 2:
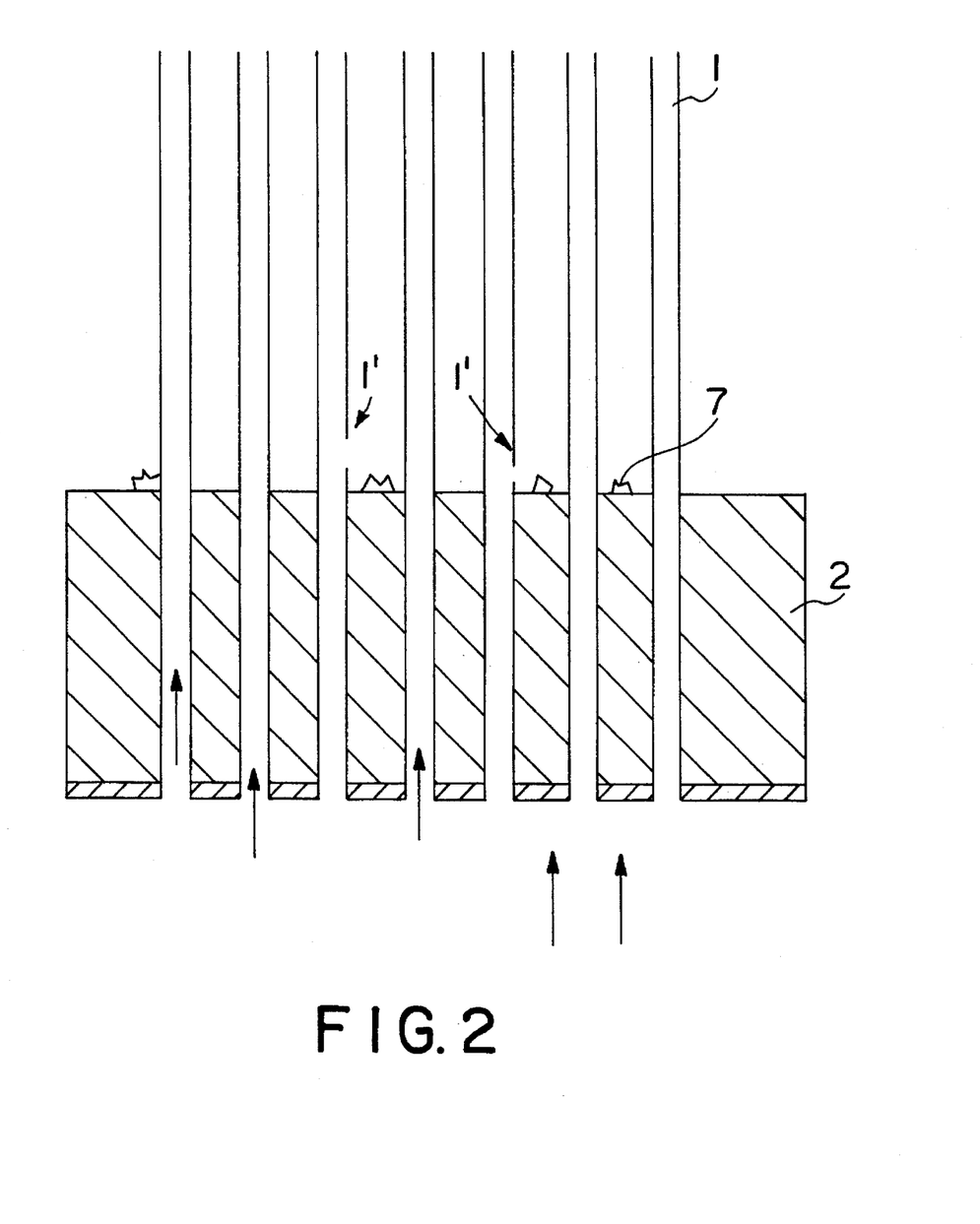
FIG. 2 is a magnified partial cross-sectional view more clearly illustrating the defective tube in Part A of FIG. 1.

FIG. 1 is a schematic illustration of a nuclear-power steam generator, a kind of heat-exchanger, while FIG. 2 is a magnified sectional view of a defective tube in a nuclear-power steam generator.

When a nuclear-power steam generator is in use for a long time (usually for several years) some of its thousands of tubes 1 may corrode because of accumulated sludge 7 and the like or otherwise break, thus making the primary fluid (containing radioactive material) 5 leak to contaminate the secondary fluid (pure water rotating the turbine) 6, and to stop this a plugging of both ends of the affected tubes becomes necessary.

Figure 3:
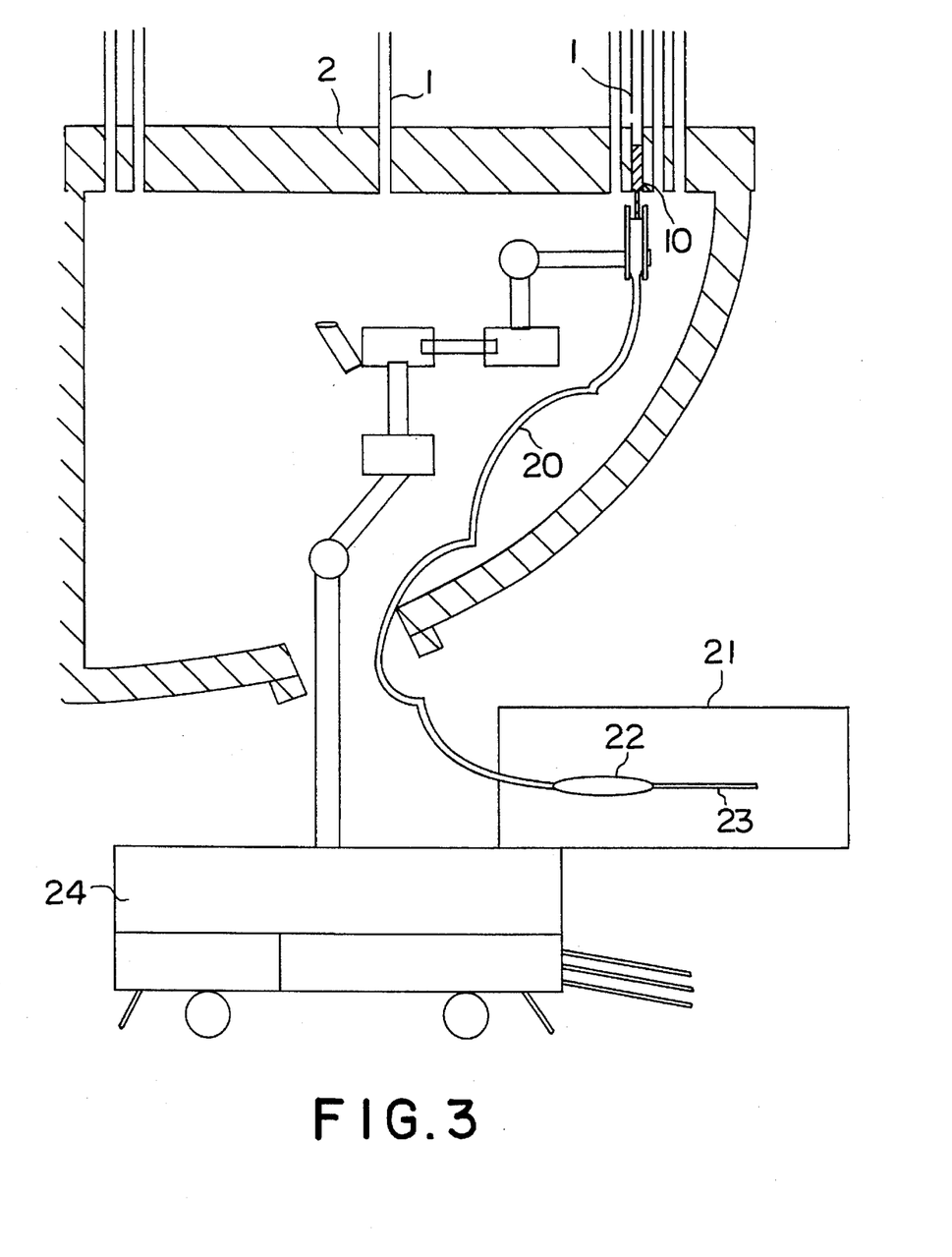
FIG. 3 is a schematic illustration of the peripheral equipment for plugging the ends of a defective tube in a heat exchanger according to this invention.

FIG. 3 is a schematic illustration of the plug and the peripheral equipment for plugging a defective tube in a nuclear-power steam generator according to the present invention.

A plugging assembly 10 is inserted inside the end of a defective tube 1, and the explosive 12 charged inside plug 11 is connected with an industrial detonator or electrical detonator 22 inside a silencing box 21 placed outside said plug 11 by a connecting wire 20.

In FIGS. 3 to 8, a cylindrical plug 11 is of a structure that its forward end is closed in the shape of half a circle, while its rear end is open, made of a annealed inconel 600 or 690, but as it is to be used under variant corrosive circumstances titanium or stainless steel alloys are to be preferred. The outer diameter of said plug 11 is smaller by 0.25 mm to 0.44 mm than the inner diameter of a tube, and the thickness of said plug 11 is preferably 1.05 mm to 2.15 mm.

The explosive 12 of rod type with circular cross section inserted longitudinally in the central part of the inside of plug 11 is of ammonium nitrite (AN), penthrit (PETN), hexogen (HMX), cyclodimethyl emitt rinitramine (RDX), and the like, the amount of this explosive can be adjusted according to the required hydraulic pressure. In the present invention the amount of explosive 12 is kept within the range of 3.2 g/m to 8.5 g/m.

The explosive 12 inside plug 11 is connected with connecting wire 20, detonator 22, and detonation wire 23, in that order, and by means of lighting detonation wire 23 explosive 12 is made to explode and thus plug 11 and the defective tube 1 are weld together.

The cylindrical buffer 13 surrounding explosive 12 is an important member of the assembly of the present invention serving as buffers between plug 11 and explosive 12 and made from a material of ductile low density polyethylene resin of elongation rate, 400 % to 1,200%, it is inserted in plug 11 leaving a certain size of space above it. The first role of buffer 13 is to transfer explosive power to plug 11 at the moment of the explosion and thus making it possible to weld the plug 11 and inner wall of defective tube 1 without the gap between them. The second role of buffer is to absorb the residual material left after the explosion. Thus removal of buffer 13 after the explosion results in a simultaneous cleaning of the inside of plug 11.

Figure 4A:
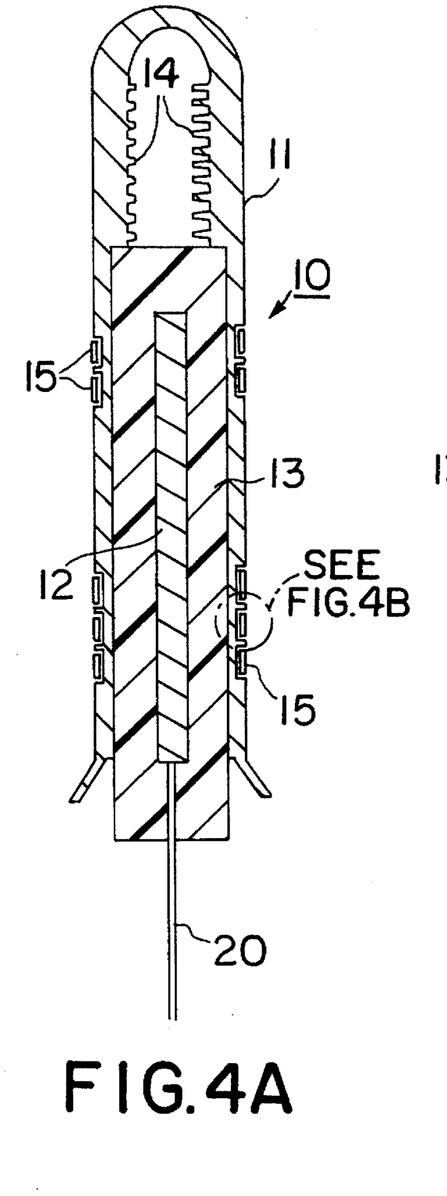
FIG. 4 is a cross-sectional view of the plugging assembly for provisional plugging according to this invention.
Figure 4B:
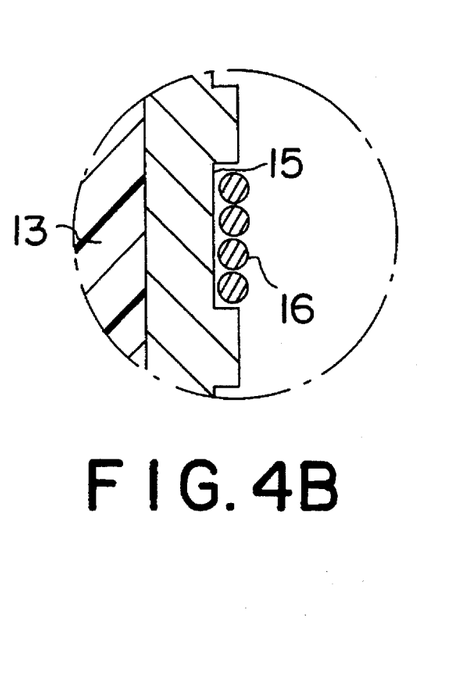

FIG. 4 shows the plugging assembly for provisional plugging comprising plug 11, explosive 12 and buffer 13, wherein the plug 11 has a female screw 14 formed on the inside of the forward end of it and grooves formed around the outer circumference of it, each 0.25 mm to 0.45 mm in depth, whose number ranging from two to six. The female screw 14 formed inside the forward end of the plug for provisional plugging is intended to accommodate easy removal of the plug 11 for the possible future necessity. The plug can be removed by inserting a rod with a male screw of corresponding pitch with that female screw in plug, turning it to join the female screw formed inside the plug, and by applying a separate oil-hydraulic system. Meanwhile the grooves 15 formed around the outer circumference of the plug for provisional plugging are shaped in a concave style, on the contrary to the prominences of the plug for permanent plugging, and so it is easy to remove the plug after the explosion welding. Inside grooves 15 formed around outer circumference of plug 11, four or five annular rings 16 of an anti-corrosive alloy of gold and nickel with a diameter of 0.28 mm to 0.52 mm are contained. The characteristic feature of these rings is to maintain air-tightness after the welding by explosion and serve as a lubricant for removal of the plug when the welded plug is removed. In the present invention, these annular rings 16 are most preferably made of an alloy of gold in 84 weight % to 95 weight % and nickel in 5 weight % to 16 weight %.

In the plugging assembly for permanent welding, in FIG. 5, two to six convex prominences 17 of 0.25 mm to 0.45 mm in height are formed around the outer circumference of plug 11 and so, as is seen in Example 2 below, the granted hydraulic pressure resistance of welded plug 11 is high and the drawing load of said plug 11 is also extremely large after the welding by explosion, whereby the defective tube 1 can be permanently plugged. During an experiment of the thermal shock on the plug for permanent plugging of the present invention, it was observed that both the hydraulic pressure resistance and drawing load rather unexpectedly increased after the explosion welding, and it was confirmed that no leakage of fluid occurred while the equipment was in use.

Figure 5A:
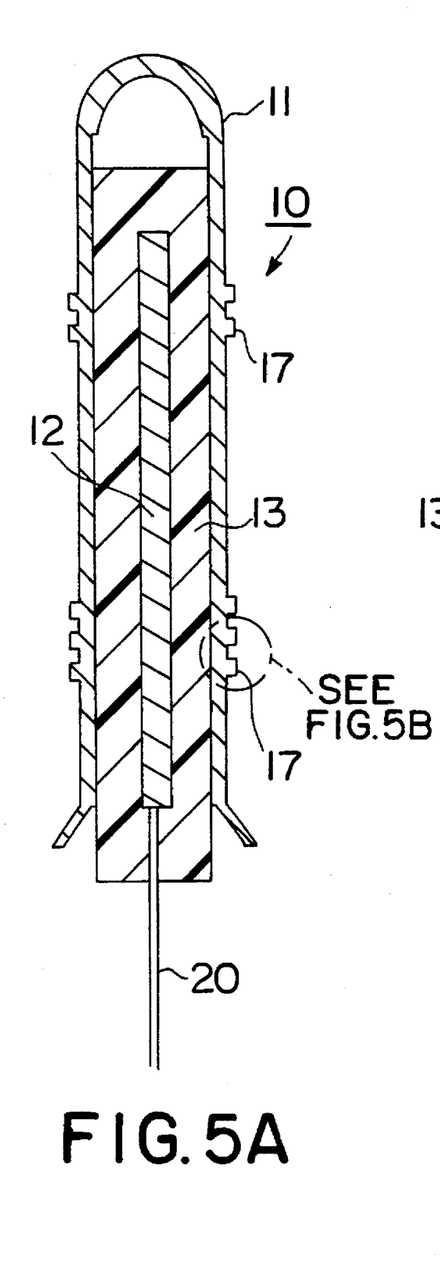
FIG. 5 is a cross-sectional view of the plugging assembly for permanent plugging according to this invention.
Figure 5B:
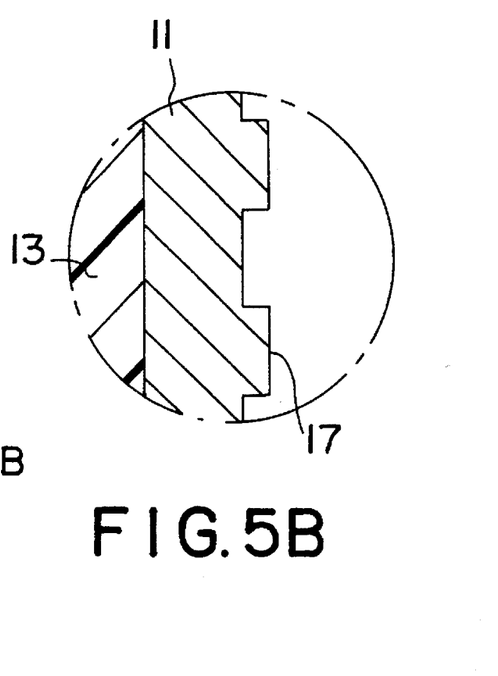
Figure 6:
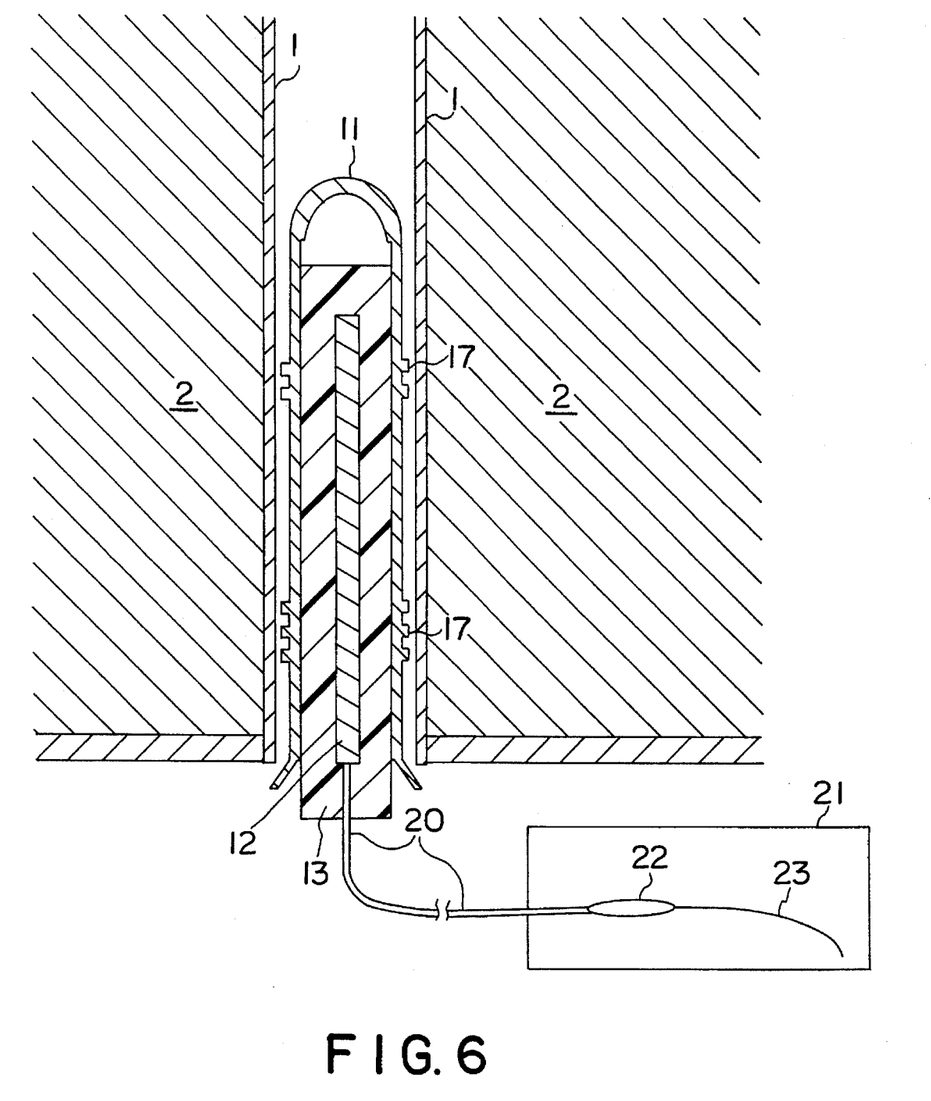
FIG. 6 illustrates the plug of FIG. 5 inserted in a defective tube.
Figure 7:
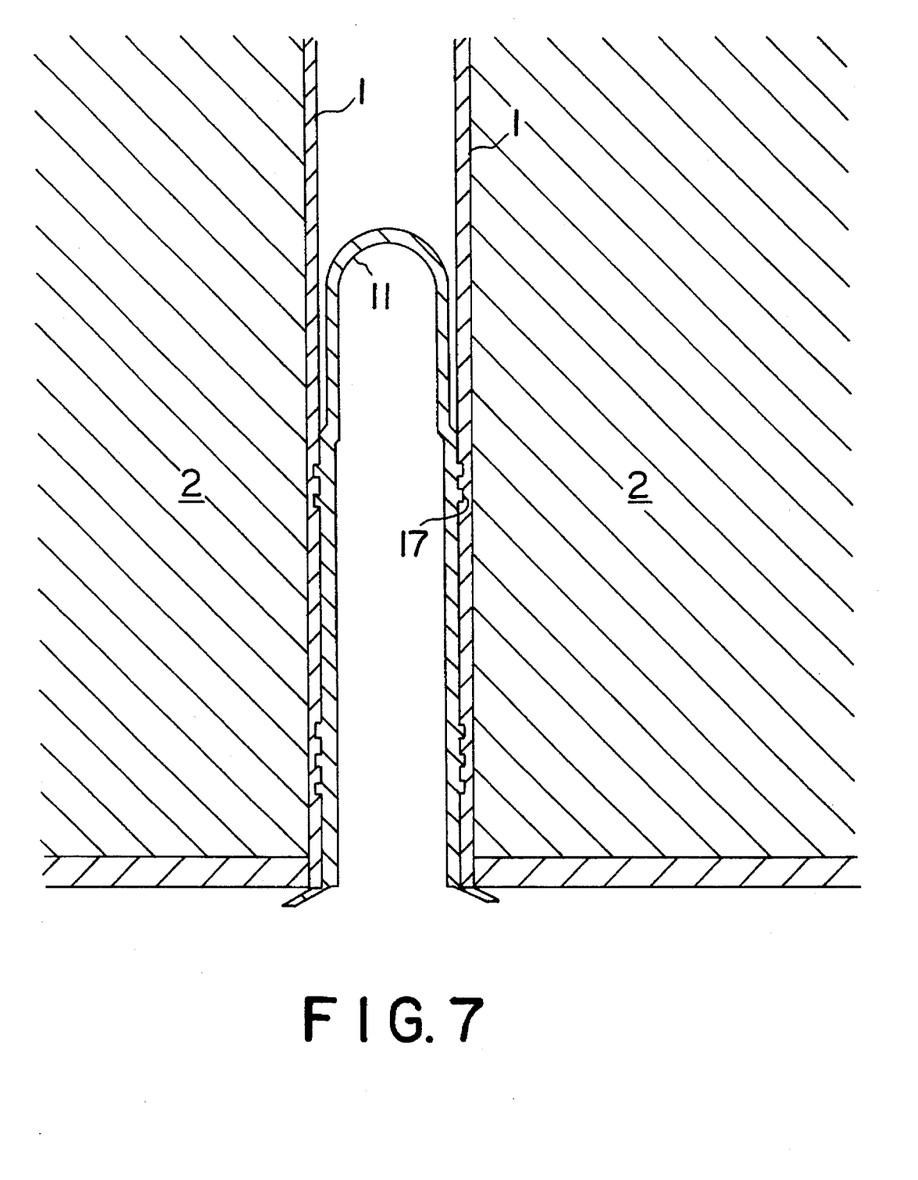
FIG. 7 illustrates the plug of FIG. 5 welded to the inner wall of a defective tube by explosive welding.
Figure 8:
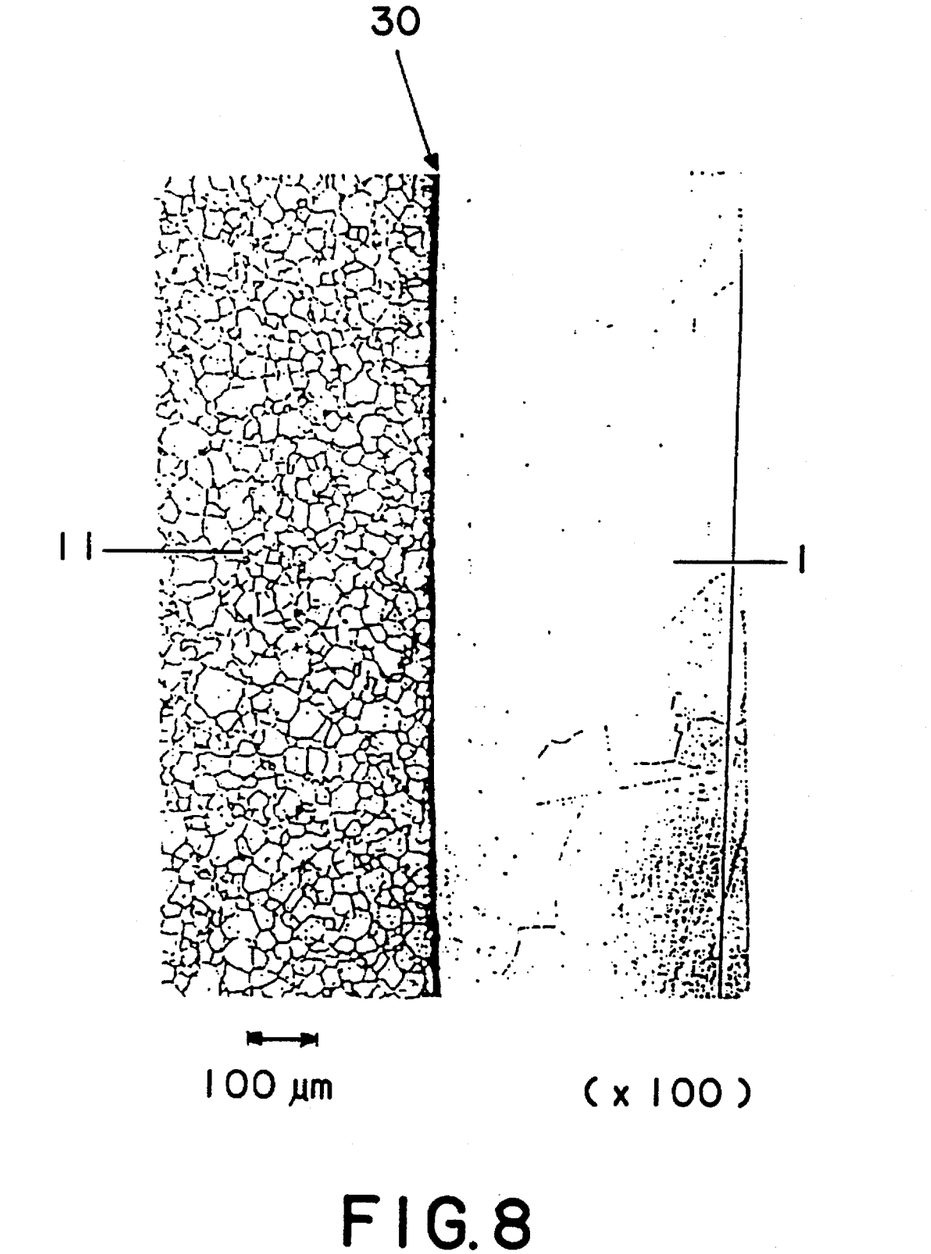
FIG. 8 is a magnified partial cross-sectional view of the welded boundary between a plug of FIG. 4 and the inner wall of a defective tube.

When the plugs for provisional plugging of FIG. 4 and for permanent plugging of FIG. 5 are compared with each other, both are almost equal in hydraulic pressure resistance, anti-corrosive feature, and mechanical strength.

Figure 9:
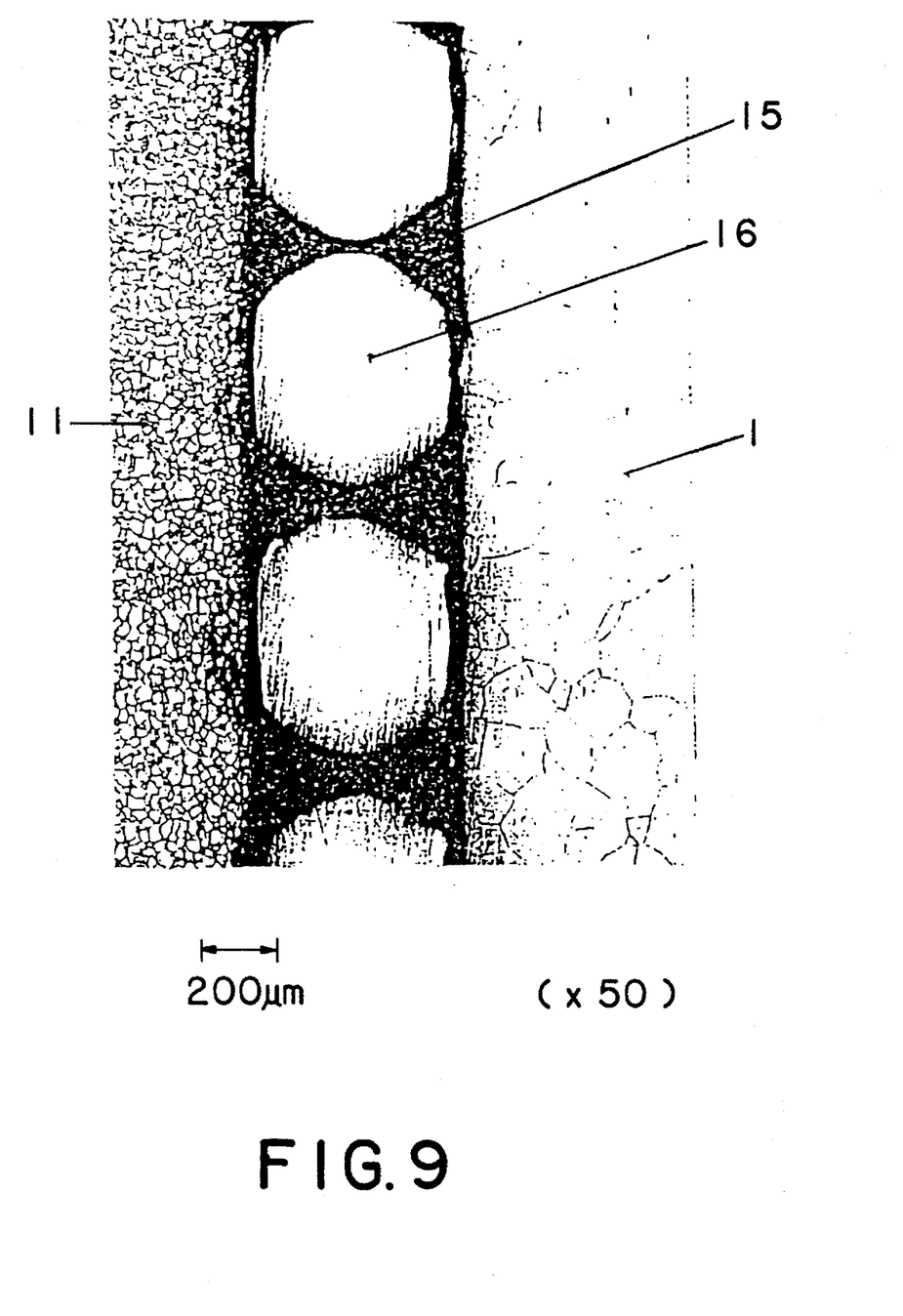
FIG. 9 is a magnified partial cross-sectional view illustrating the welded boundary between the rings of a plug of FIG. 4 and the inner wall of a defective tube.

As it is illustrated in the blow-up picture of a provisional plugging assembly after the explosion in FIG. 9, the annular rings 16 between tube 1 and plug 11 undergo deformation by calcination at the time of explosion, and adhere tightly to the inner wall of a tube 1, thus functioning to seal, and so the hydraulic pressure resistance is improved even at the time of use under the condition of thermal shock. The rings 16 serve as lubricant between tube 1 and plug 11 when a plug 11 is removed, making the removal much easier.

Figure 10:
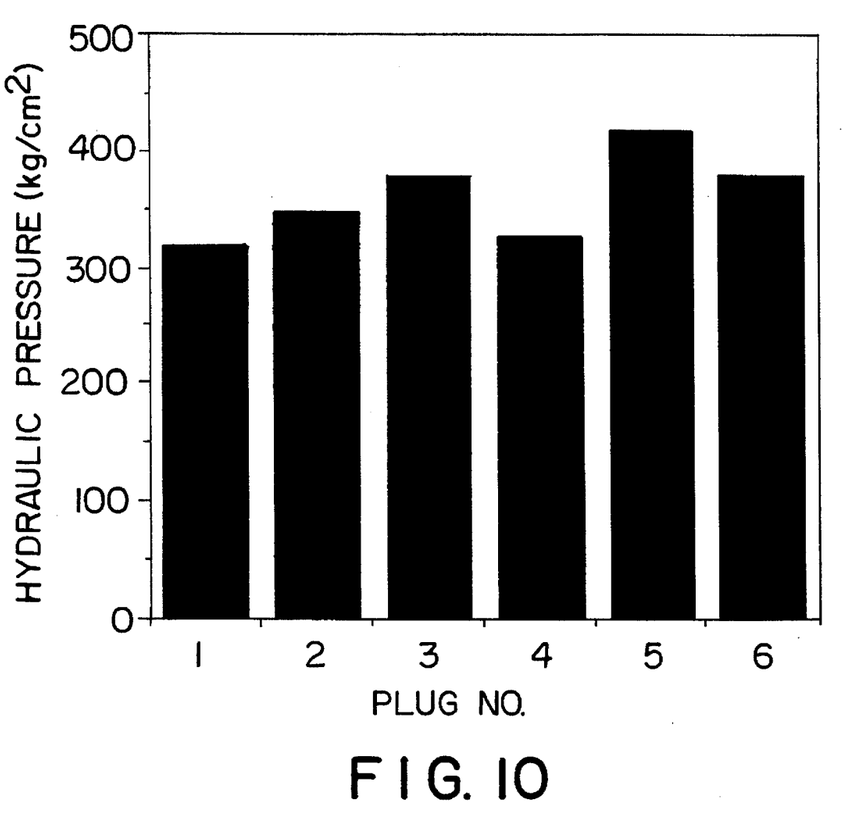
FIG. 10 is a graph illustrating the hydraulic pressure resistance after explosive welding of plugs of FIG. 4.
Figure 11:
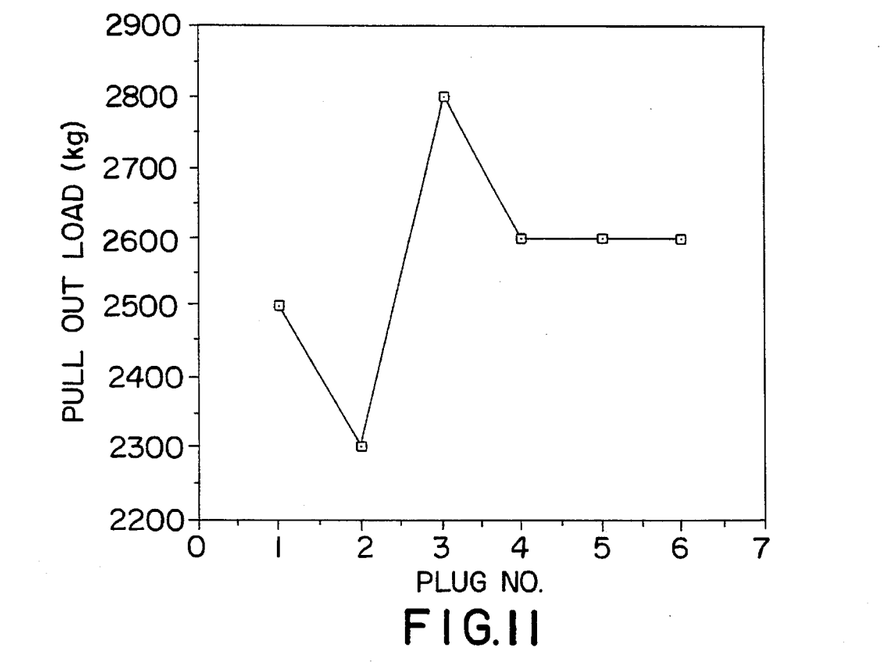
FIG. 11 is a graph illustrating the pull out loads after explosive welding of plugs of FIG. 4.
Figure 12:
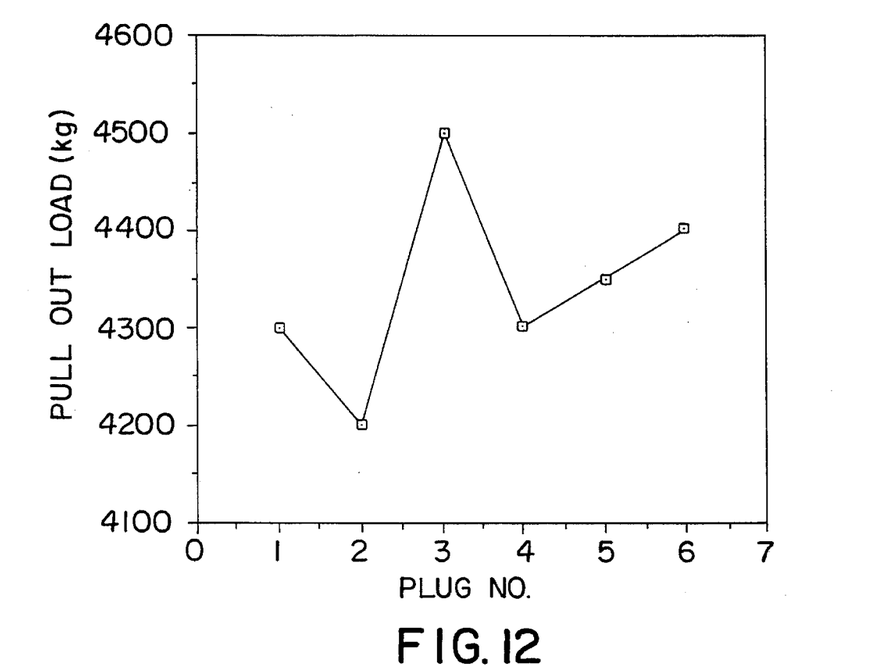
FIG. 12 is a graph illustrating the pull out loads after thermal shock experiments of plugs of FIG. 4.

As is shown in FIGS. 10 to 12, the experiment on the assembly for provisional plugging did, like the assembly for permanent plugging, result in an increase in the hydraulic pressure resistance and the drawing load, and no leakage of fluid was observed, in a same experience on the thermal shock.

Below, the present invention is described in further detail making reference to the examples of its embodiment:

EXAMPLE 1

A plugging by explosion was performed on a defective tube 1 of a steam generator in a nuclear power plant, the tube made of inconel 600, its diameter 19.05 mm and thickness 1.05 mm, with a plugging assembly 10 for provisional plugging of FIG. 4, which comprised a plug made of inconel 690 of 16.35 mm in diameter and 1.80 mm in thickness, 5.3 g/m of hexogen for the explosive 12, and a buffer 13 of low density ductile polyethylene resin. As a result, the hydraulic pressure resistance of each sample was found more than 320 kg/cm² as is seen in FIG. 10 and the drawing load more than 2,300 kg, as it is observed in FIG. 11, although there were some differences in samples due to the presence of remnant impurities in the defective tube, minute errors in the amount of explosives and in processing of the plug and inconsistency in the inner diameter of the defective tube, etc. In consideration of the operating hydraulic pressure of ordinary nuclear-power steam generator being less than 176 kg/cm² and the hydraulic pressure for high pressure feed-water heater being about 280 kg/cm², the minimal hydraulic pressure resistance, 320 kg/cm², of the plug for a provisional plugging of the present invention is normally enough, being about 2.5 times the maximal operating hydraulic pressure of nuclear-power steam generator, and the allowable drawing load of the plug for provisional plugging of the present invention, 2,300 kg also is more than five times that of a nuclear-power steam generator, 450 kg. And the drawing load after a test on thermal shock of 100 cycles at temperatures of normal to 430° C. on the plugging assembly of the present invention was found risen to 4,200 kg, as is shown in FIG. 12. This indicates the hydraulic pressure resistance against leakage of the fluid at use after the explosion-plugging will rather rise.

EXAMPLE 2

On a defective tube 1 of a material of stainless steel 304, 15.87 mm in diameter and 2.10 mm in thickness, of a thermoelectric power plant's high pressure feed-water heater was performed an experimental plugging by explosion with an assembly 10 for permanent plugging, shown in FIG. 5, made of iconel 600, 11.25 mm in diameter and 1.85 mm in thickness, charged with an explosive of 3.6 g/m of penthrit, and equipped with a buffer 13 of low density ductile polyethylene, with a result in an improved hydraulic pressure resistance of 450 kg/cm² and up and drawing load of over 2,600 kg. And the hydraulic pressure resistance and drawing load after a test on thermal shock at temperatures ranging from normal to 460° C even increased to 480 kg/cm² and 3,400 kg respectively.

One of the advantageous effects of the present invention is that the feasibility of the task even in the normally unfavorable circumstances. In the present invention, a simple cleaning of the inside of a defective tube with cotton brushes before plugging is good enough for plugging since unwanted impurities and oxides can be easily removed by buffer 13 during explosion, as is seen in the blow-up picture of the cross section of wielded boundary in FIG. 8, although in prior arts it is imperative to undergo all the troublesome task of meticulously removing these impurities before plugging and so the inside of a defective tube must be cleaned by means of an abrasive drill, stainless steel brush, and a cotton brush, respectively, in order to improve the effects of plugging the tube by welding, and, thus, in the present invention this task of cleaning can be entirely dispensed with even under extremely unfavorable conditions for working such as an area contaminated with radioactivity. Also the operation for plugging is very convenient due to the simple structure of the assembly, and in the case of a plugging for provisional plugging has an additional advantage as the weld plug can be removed at will.

Besides, the process of plugging by the present invention hardly affects the tube sheet holes and the welded parts of other good tubes negatively, and makes the hydraulic pressure resistance against leak fairly greater after plugging is done by explosion.

What is claimed:

1. The tube-plugging assembly for explosively expanding a plug in a damaged tube, said assembly comprises:

a substantially cylindrical plug having a closed first end with a rounded configuration and an open second end;

an explosive charge and a buffer subassembly comprising
      an explosive charge in a rod configuration with a circular cross section,
      a substantially cylindrical buffer surrounding said explosive charge, said subassembly disposed within said plug in a longitudinal orientation so as to leave an unoccupied space between a first end of said subassembly and said closed first end of said plug; and a connecting cord for connecting said explosive charge to a remote detonator.

2. A tube-plugging assembly of claim 1, wherein said plug is of a material of annealed inconel 600, inconel 690, titanium alloy, or a stainless steel alloy, the outer diameter of said plug being 0.25 mm to 0.44 mm than the inner diameter of a defective tube of a heat exchanger, and and the thickness of said plug being 1.05 mm to 2.15 mm.

3. The tube-plugging assembly of claim 1, wherein in the unoccupied space between a first end of said subassembly and said closed first end of said plug, said plug has a plurality of female threads proximate to and on the inside of the closed first end, said threads for engaging a correspondingly threaded male member for facilitating removal of said plug.

4. The tube-plugging assembly of claim 3, wherein said plug further comprises two to six grooves of 0.25 mm to 0.45 mm depth around the outer circumference of said plug, and four to five annular rings of an alloy of gold and nickel of 0.25 mm to 0.52 mm in diameter contained in said grooves.

5. The tube-plugging assembly of claim 1, wherein said plug further comprises two to six annular prominences of 0.25 mm to 0.45 mm in height around the outer circumference of said plug for increasing pull-out resistance of said plug after explosive expansion.

6. The tube-plugging assembly of claim 1, wherein said explosive charge is selected from the group consisting of ammonium nitrate (AN), penthrit (ETN), hexogen (HMX), and cyclodimethyl emitt rinitramine (RDX).

7. The tube-plugging assembly of claim 6, wherein the amount of said explosive ranges from 3.2 g/m to 8.5 g/m.

8. A tube-plugging assembly of claim 1, wherein said buffer encircling said explosive is made of low density ductile polyethylene resin with an elongation rate of 400% to 1,200%.

9. The tube-plugging assembly of claim 4, wherein said annular rings contained in said grooves are made of an alloy of 84 weight % to 95 weight % gold and 5 weight % nickel.

\* \* \* \* \*